United States Patent [19]

Clausen et al.

[11] 4,285,758
[45] Aug. 25, 1981

[54] BONDING APPARATUS FOR THERMOPLASTIC COATED MATERIALS

[75] Inventors: Victor H. Clausen; Charles E. Asbury, Jr., both of Vancouver, Wash.

[73] Assignee: H. B. Fuller Company, St. Paul, Minn.

[21] Appl. No.: 134,098

[22] Filed: Mar. 26, 1980

Related U.S. Application Data

[63] Continuation-in-part of Ser. No. 42,350, May 25, 1979, abandoned.

[51] Int. Cl.³ ............................................. B32B 31/00
[52] U.S. Cl. .................................. 156/498; 156/499; 156/574; 156/575; 156/576; 156/578
[58] Field of Search ............... 156/166, 304, 306, 358, 156/359, 361, 388, 497, 498, 499, 545, 574, 575, 576, 577, 578, 579, 582, 583.1, 583.8, 583.91, 389

[56] References Cited

U.S. PATENT DOCUMENTS

| 3,148,104 | 9/1964 | Rapp | 156/575 |
| 3,660,206 | 5/1972 | Ortel | 156/545 |
| 3,769,125 | 10/1973 | Bethge | 156/166 |
| 3,875,368 | 4/1975 | Biewald | 156/499 |
| 4,181,558 | 1/1980 | Newbronner | 156/359 |

FOREIGN PATENT DOCUMENTS

| 747239 | 9/1970 | Belgium | 156/497 |
| 2606694 | 8/1972 | Fed. Rep. of Germany | 156/497 |
| 49-40876 | 11/1974 | Japan | 156/497 |

Primary Examiner—Caleb Weston
Attorney, Agent, or Firm—Merchant, Gould, Smith, Edell, Welter & Schmidt

[57] ABSTRACT

A bonding apparatus for applying a thermoplastic-adhesive coated core material to a moving substrate as disclosed. Heat exchanger guide means directs a continuous length of hot melt strand to an output orifice at a bonding station. The hot melt adhesive is softened by the unique heat exchanger means to its flow point, just before the strand leaves the output orifice. A rapidly replaceable bonding shoe presses the hot melt strand onto a substrate moving past the bonding station, as soon as the heated strand leaves the output orifice, thus bonding the strand to the moving substrate. Biasing means selectively provides presettable compression or tension forces to the bonding shoe, as required by the particular bonding application. Optional cooling apparatus positioned immediately downstream from the bonding station, further compresses the hot melt strand on the substrate and cools the adhesive to bonding consistency.

38 Claims, 10 Drawing Figures

BONDING APPARATUS FOR THERMOPLASTIC COATED MATERIALS

CONTINUATION-IN-PART APPLICATION

This application is a continuation-in-part of a copending U.S. patent application entitled Bonding Apparatus for Thermoplastic Coated Materials filed on May 25, 1979 and assigned Ser. No. 06/042,350, now abandoned.

TECHNICAL FIELD

This invention relates broadly to bonding apparatus. More particularly, this invention relates to apparatus for applying and bonding a continuous thermoplastic-adhesive coated core material to the surface of a moving substrate.

BACKGROUND OF PRIOR ART

There are a large number of products and applications in which it is desirable and advantageous to reinforce a basic substrate material with a secondary material such as a string, thread, strand or tape that exhibits a relatively high tensile strength as compared to the basic substrate material. When the secondary material is securely bonded to the substrate, the composite structure exhibits the fundamental properties of the base substrate material with the increased tensile strength properties of the secondary material. Examples of such composite structures include tear tapes for use with multiwall bags and corrugated cartons and reinforced paper products such as tapes and corrugated paper. The basic substrate/strand combining process also finds significant commercial usage in industrial product fabrication processes such as in the joining of veneers and in laminating various kinds of substrates, including nonwoven fabrics and paper.

For the purposes of describing this invention, and as used herein, the terms thread, string, strand and tape will be used interchangeably in describing the "secondary" material that is bonded to the base substrate. When used, such terms are intended to apply in their broadest sense, as any thread or tape-like construction comprising a plurality of filaments or fibers, or a plurality of thread-like units made up of multiple ends or filaments. This invention contemplates the use of any "secondary" material in strand or thread form, as defined, which exhibits a relatively high degree of tensile strength when compared to the underlying substrate, and is capable of being pressed or flattened onto a base substrate material.

The basic thread/strand/string/tape of the secondary material (commonly referred to as the "core") is uniformly coated and/or impregnated with a thermoplastic adhesive (commonly referred to as "hot melt"). The specific core and hot melt materials which comprise the secondary material for any particular application are respectively selected for their intended end use requirements. The thermoplastic adhesives are solids at normal (ambient) temperatures, but become soft as they are heated and will flow at elevated temperatures. The core/hot melt material is commonly bonded to the base substrate material by a thermocompression bonding technique. This technique comprises the fundamental steps of:

(1) heating the thermoplastic adhesive bearing core material until the adhesive exceeds its "flow point," so that it can "wet" onto the substrate;

(2) applying the heated core/hot melt material to the substrate;

(3) applying pressure to the applied core/hot melt combination on the substrate, thus flattening out the core material and spreading the hot melt relative thereto on the substrate, and (4) allowing the hot melt to cool, thereby bonding the core material to the substrate.

This process is typically used for applying continuous such secondary strengthening materials to continuous substrates which are being processed through machinery at speeds typically ranging between 25 to 1,000 feet per minute.

A number of differing ways of performing the various individual steps of the thermocompression bonding cycle have been practiced in the past. For example, the hot melt has been heated to its flow point through conduction by passing the core/hot melt material through electrically heated tubes or capillaries, or over an electrically heated wheel or roller; through convection, by subjecting the core/hot melt material to currents of pressurized heated air; and through a combination of the conduction and convection techniques. Similarly, various techniques for pressing the heated core/hot melt material onto the moving substrate have been practiced, such as pressing the core/hot melt and substrate together between a pair of rollers forming a nip or by pressing the core/hot melt onto a substrate with cold or heated plate members. Such prior art techniques, however, have typically used complex or special-purpose structure and have either been too costly, too slow or too inflexible to accommodate changing use applications, generally did not form reliable bonds and generally did not give the degree of control required over the bonding variables to effect quality bonds in a number of different applications.

For example, a common problem associated with such prior art bonding apparatus is that a significant time interval exists between that instant of time at which the heated core/hot melt material leaves the heating apparatus and that instant of time at which the core/hot melt material is pressed onto the substrate. During that time interval, the hot melt cools, thus reducing its wetting, and thus bonding capability. To insure that the hot melt remained above its flow point until it was pressed onto the substrate, such prior art apparatus required the core/hot melt to be heated to temperatures significantly above the flow point of the hot melt, to compensate for the cooling delay. This over-compensation would often result in excessive flow of the hot melt in the heating apparatus, leading to clogging of the heater duct and possible charring of the hot melt and/or melting of the core material if the bonding apparatus were to temporarily stop (i.e. if the core material were to stop advancing through the bonding apparatus). Further, to attain the over-compensated temperature when bonding to fast-moving substrates, the prior art structures required undue complications in the design of their heating chambers. Another deficiency of prior art bonding apparatus is the complex and special purpose nature of their pressure applying/bonding apparatus. For example, those structures having large special-purpose bonding heads for applying core/hot melt compositions to veneers on a horizontal plane, cannot generally be easily modified or adapted to apply such core/hot melt materials to tapes or to other substrates advancing in a vertical plane, or over a differently shaped surface underlying the substrate. A further problem associated with those prior art structures applying a nip to press the core/hot melt material onto the substrate, is that due to the tangential "point-contact" nature of the nip formed between two rollers, such structures have not insured adequate dwell time of the bonding force upon the core/hot melt, for insuring quality bonds. This problem becomes more acute as the substrate speed increases.

The present invention overcomes many of the above-mentioned shortcomings of prior art methods for bonding continuous core/hot melt materials to moving substrates. The present invention provides a simple, efficient and highly flexible apparatus for providing high quality bonds of core/hot melt materials to a wide variety of moving substrates, and is readily adaptable to changing bonding conditions and substrate speeds.

SUMMARY OF THE INVENTION

The present invention comprises an applicator apparatus for bonding a continuous thermoplastic-adhesive coated core material to a substrate moving over a reactive surface, at a bonding station. The reactive surface can be any medium or material suitable for applying a reactive force to a substrate being urged thereagainst by a bonding force exerted by the applicator apparatus at the bonding station. The bonding apparatus includes guide means having an elongate guide chamber or passageway terminating at an output orifice, for guiding or directing a continuous length of thermoplastic-adhesive coated core material therethrough, from a source for such coated material, to the output orifice. Heater means are cooperatively connected with the guide for heating the thermoplastic-adhesive coated core material as it proceeds through the guide chamber such that the thermoplastic adhesive attains its flow-point temperature by the time the core material carrying that adhesive emerges from the output orifice of the guide chamber. A bonding shoe is mounted at the output orifice of the guide means, and has a generally planar shoe bonding surface. Mounting means orient the output orifice and bonding shoe at the bonding station such that the shoe bonding surface cooperatively addresses and lies generally parallel to the reactive surface over which a substrate is continually moved. Means are provided for heating the bonding shoe to substantially the same temperature of the core/hot melt material emerging from the output orifice.

The heated core/hot melt material emerging from the output orifice of the guide means passes immediately over the shoe bonding surface and into engagement with a substrate overlying the reactive surface. The moving substrate pulls the core/hot melt material with it as it proceeds over the reactive surface, thereby advancing the continuous core/hot melt material through the guide means. Biasing means, suitable for applying either compressive or tension forces to the bonding shoe at the bonding station, forces the shoe bonding surface into sliding engagement with the substrate moving over the reactive surface, thereby pressing the core/hot melt material passing over the bonding shoe surface into bonding engagement with the moving substrate which is sandwiched between the bonding shoe surface and the reactive surface.

In a preferred embodiment of the invention, the bonding shoe is mounted to the guide means at the output orifice thereof, and has an aperture or passageway formed through the shoe, which defines a continuation of the heated output orifice of the guide means.

The bonding shoe is rapidly detachable from the guide means and can readily be replaced when worn or replaced by a bonding shoe of varied construction to accommodate various shaped substrates and/or reactive surfaces, both with respect to geometrical shapes of the reactive surfaces and their relative angular disposition relative to the bonding shoe at the bonding station. The guide and shoe combination applies the heated core/hot melt material to the substrate in a manner which minimizes the angular difference between the relative directions of movement of the core/hot melt material and the moving substrate.

In one embodiment of the invention, the guide chamber comprises an elongate guide tube through which the core/hot melt material advances toward the output orifice. The thermoplastic adhesive coating is melted by a current of compressed or pressurized air heated by a heater and forced through the guide tube in a direction opposite to the direction of travel of the core material. In a preferred arrangement of this heating configuration, the heated air is introduced to the guide tube at or adjacent its output orifice, to maximize the temperature of the adhesive coating at the output orifice. In this embodiment of the invention, the bonding shoe substantially surrounds the output orifice and engages the substrate at the bonding station in a manner so as to substantially prevent flow of the pressurized heated air past the bonding shoe. Temperature sensing means are provided to accurately control the temperature of the pressurized heated air flowing into the guide tube. In a preferred embodiment of the invention using this heating technique, the bonding shoe is heated both by conduction from the guide means and by the pressurized heated air.

In an alternative embodiment of the invention, the guide chamber comprises a curved passageway formed through a block of heat conducting material, heated to a predetermined temperature by appropriate electrical heating elements. The curved nature of the guide passageway forces the core/hot melt material advancing therethrough into conductive engagement along the entire length of the guide passageway, thereby heating the thermoplastic adhesive to its flow-point by the time the core material carrying that adhesive emerges from the output orifice.

Means for cooling and further compressing the applied core/hot melt material may be provided downstream from the bonding station for cooling the thermoplastic adhesive and core material following the bonding thereof to the substrate at the bonding station. Such structure preferably comprises a cooling wheel mounted for movement with the guide and shoe assembly, and engaging the substrate immediately downstream from the bonding shoe surface, so as to set and further compress the core/hot melt material onto the substrate during the cooling process. Means for applying a release agent to the cooling wheel and a scraper for slidably engaging the surface of the cooling wheel minimize sticking of the thermoplastic adhesive to the cooling wheel and help to maintain efficient operation thereof. Pressure adjustment means may be provided for accurately setting the pressure applied by the wheel surface, to sandwich the core/hot melt material onto the substrate.

For certain uses of the invention, for example in applying plywood veneers, it may at times be desirable to separate the bonding shoe member slightly from the bonding surface, such that the trailing wheel assembly simultaneously bonds, sets and cools the core/hot melt strand onto the bonding surface. In such instances, the present invention allows for very close proximity (on the order of a few centimeters) between the tip of the bonding shoe and the nip point of the trailing wheel assembly.

It will be understood that many configurations and variations of the respective portions of the bonding apparatus, as described in more detail hereinafter, can be designed within the scope of this invention. For example, while several preferred configurations of the bonding shoe assembly will be disclosed, it will be understood that many alternate types of shoe configurations can be designed within the broad scope of this invention. Similarly, while a particular configuration for the biasing means used for applying bonding forces to the shoe bonding surface will be disclosed in association with the preferred embodiments of this invention, it will be understood that other such biasing means could be envisioned within the scope of this invention. Further, while particular configurations for applying heat to the advancing core/hot melt material will be disclosed, it will be understood that other heating configurations can be employed.

It will be understood that the principles of this invention extend beyond the illustrations of the preferred embodiments disclosed herein, and are limited only by the claims annexed hereto, which characterize various advantages and features of novelty of the invention. However, for a better understanding of the invention and its advantages obtained by its use, reference should be had to the Drawing which forms a further part hereof, and to the accompanying descriptive matter in which there are illustrated and described several embodiments of the invention.

BRIEF DESCRIPTION OF THE DRAWING

Referring to the Drawing, wherein like numerals represent like parts throughout the several views.

DETAILED DESCRIPTION OF THE INVENTION

Figures 1, 3:
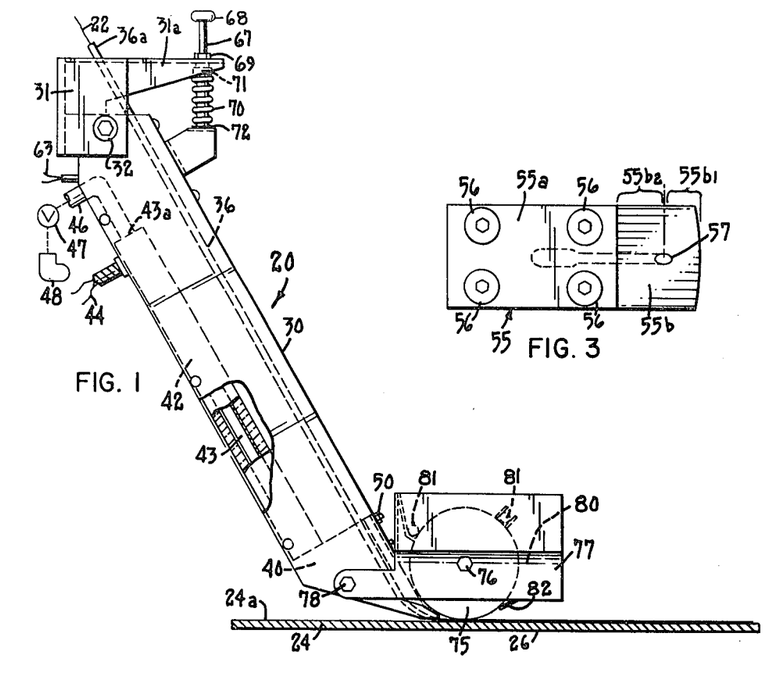
FIG. 1 is a side elevational view, with portions thereof broken away, of a bonding apparatus constructed according to the principals of this invention.
FIG. 3 is a bottom plan view of the bonding shoe portion of the bonding apparatus disclosed in FIGS. 1 and 2.

Referring to FIG. 1, there is generally disclosed at 20 a bonding applicator, generally constructed according to the principles of this invention, for applying and bonding a thermoplastic-adhesive coated core material 22 to one surface 24a of a substrate 24, moving over a reactive surface, generally designated at 26. The thermoplastic-adhesive coated core material 22 may comprise any continuous material generally classified within the previously defined core/hot melt category of such materials, and, in the preferred embodiment illustrated, comprises a "core" consisting of many continuous synthetic filaments uniformly coated with thermoplastic adhesive "hot melt," and is sold under the brand name STRING KING ®. The particular material comprising the "core" and "hot melt" portions of the composite material are respectively chosen for their properties as dictated by the end use requirements. For example, if the core/hot melt material is to be applied to a low-temperature substrate, then a thermoplastic adhesive with a relatively low softening temperature (typically referred to as a Ring & Ball softening point) can be employed. Conversely, if the core/hot melt material is to be applied to a substrate having an elevated temperature (for example to a hot corrugated web during manufacture thereof, having a temperature of approximately 140° F.), it will be necessary to use a thermoplastic adhesive with a relatively high softening point so that it will very quickly develop a bond to the hot substrate surface.

Figures 4, 5, 6, 7:
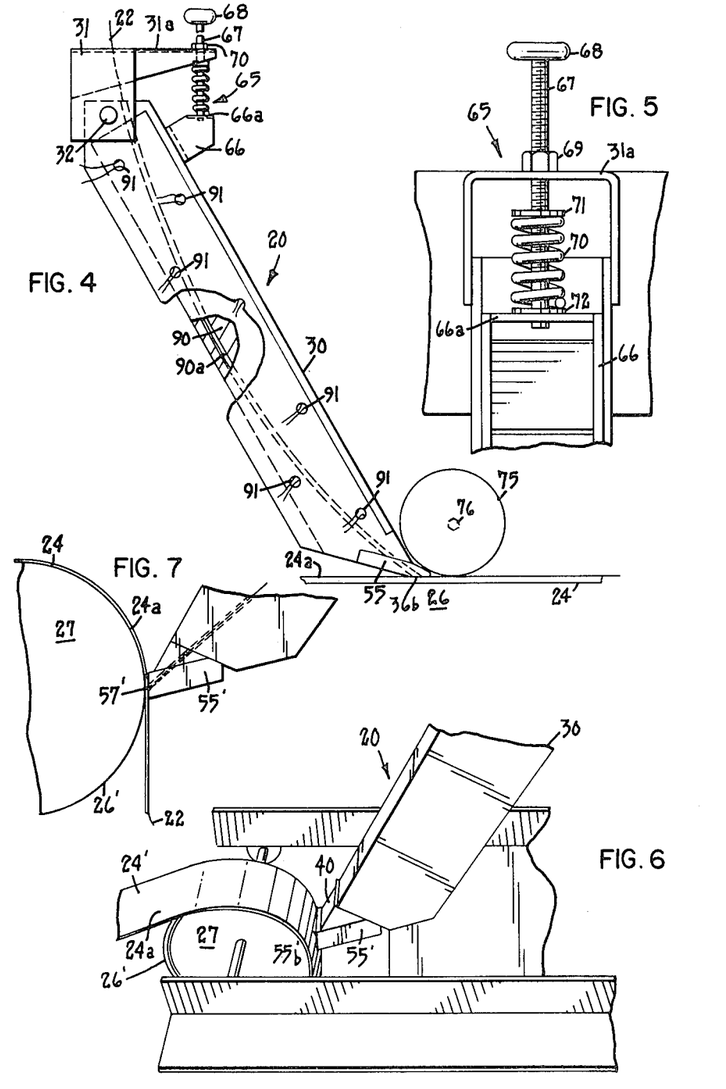
FIG. 4 is a side elevational view, with portions thereof broken away, illustrating a second embodiment of a bonding apparatus constructed according to the principles of this invention.
FIG. 5 is an enlarged view of the biasing means portion of the invention disclosed in FIGS. 1 and 4.
FIG. 6 is a partial view of the bonding apparatus disclosed in FIGS. 1 and 4, illustrating an alternative bonding shoe construction as applicable to bonding a core/hot melt material to a vertically advancing substrate.
FIG. 7 is an enlarged fractional side elevational view of the bonding shoe portion of the bonding apparatus disclosed in FIG. 6.

As is true for the core/hot melt thread or string, the substrate 24 to which the string will be bonded may assume a variety of differing properties. For example, the substrate could comprise a corrugated web, a wooden veneer, a tape, or other continuous material. The reactive surface 26 over which the substrate moves may assume a variety of configurations and/or materials. As illustrated in FIG. 1, the reactive surface is a flat or generally planar table. However, the reactive surface could comprise a curved stationary surface, a moving curved surface (as illustrated in FIGS. 6 and 7) or any other appropriate surface suitable for applying a reactive force to the bottom of a substrate being forced thereagainst by a bonding pressure exerted on the opposite or upper portion of the substrate.

While not disclosed in the figures, it will be understood that appropriate source means are provided for the core/hot melt string, as well as for the electrical power and compressed air hereinafter described with respect to various embodiments of the invention. It will also be understood that appropriate means (not illustrated) are available for continuously moving the substrate 24 over the reactive surface, since the bonding applicator of this invention will normally be used in association with a larger manufacturing process.

The bonding applicator 20, as illustrated in FIG. 1, has an external casing or frame member 30 pivotally mounted to a support base 31 about a mounting axis 32. The support base 31 is securely mounted to or forms a part of a larger stationary frame structure (not illustrated). The support base 31 has an outwardly projecting channel-shaped arm 31a outwardly extending and generally aligned with the underlying frame portion 30. The support base projection 31a mounts a biasing spring assembly described hereinafter in more detail.

Figure 2:
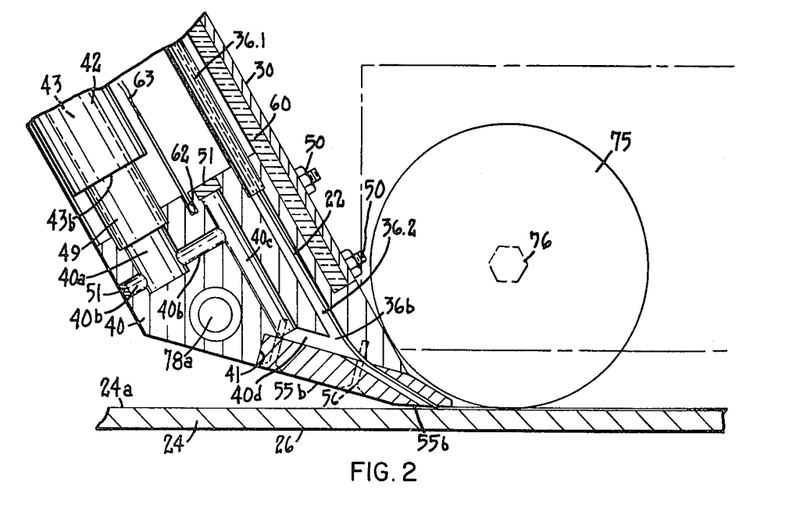
FIG. 2 is an enlarged cross-sectional view of the lower portion of the bonding apparatus disclosed in FIG. 1, illustrating relative placement of the bonding apparatus as it would appear at a bonding station overlying a moving substrate.

An elongate guide tube 36 generally extends between a first or receptor end 36a and an output orifice at its lower end, generally designated at 36b (see FIG. 2). In the first embodiment of the invention illustrated in FIGS. 1 and 2, the guide tube 36 is formed at its upper portion by a heat-conducting metallic tube 36.1 and at its lower portion by a bore formed through a block of heat-conducting material 40. In the preferred embodiment, the upper tubular portion 36.1 of the guide tube 36 is made from stainless steel, which is preferred for its relatively inert properties which minimizes oxidation of the hot melt as the adhesive is heated within the guide tube. However, it will be understood that the string heating tube could be constructed of a variety of metals. The inner diameter of the guide tube 36 is relatively small and is sized to allow free passage of the core material therethrough from its receptor end 36a to its output orifice 36b, with additional space being allowed between the hot melt string and the inner walls of the guide tube 36 to permit flow of heated compressed air (as hereinafter described) thereby, for heating the hot melt. The upper tube 36.1 is secured at its upper end to the protective frame 30 and is mounted at its lower end into the block material 40 so as to form a continuous guide passageway with the bore 36.2, for the hot melt strand 22.

A hot air heating unit 42 is mounted to the frame member 30. The heating unit 42 may be any appropriate flow-through heater for heating a column of air passing therethrough. The heater 42 has an inner passageway 43 leading between an inlet port 43a and an outlet port 43b (see FIG. 2). The passageway 43 is surrounded by resistence heater elements (not illustrated) which are electrically energized by means of the electrical conductors generally designated at 44, from an appropriate electrical source and control unit (not illustrated). In the preferred embodiment, the heater 42 is a commercially available heater typically referred to as a 1,500 watt 120 volt flow-through heater.

The inlet port 43a of the heater passageway 43 is connected by means of a conduit 46, through a air-flow control valve 47 to a source of compressed air, generally designated at 48. The outlet port 43b of the heater passage-way 43 is connected by means of a short length of heat-conductive conduit 49, having its output end mounted within a bore 40a of the base block 40.

The base block 40 comprises a block of heat-conducting metal which is securely mounted to the outer frame 30 by means of a plurality of fastening bolts 50. In the preferred embodiment, the block 40 is an aluminum block; however, other heat-conducting and retaining materials could be equally well employed. The base block 40 has second and third bores 40b and 40c respectively drilled therein and interconnecting one another and with the first bore 40a so as to form a continuous passageway with the heater passageway 43. The base block 40 further has a channel 40d formed in its lower surface and operatively connecting the third bore 40c and the bore 36.2 of the guide tube 36, thereby completing the air flow path from the heater 42, through the block 40 and into the output orifice 36b of the guide tube 36. The outer and top ends respectively of the second and third bores 40b and 40c contain plugs 51, to prevent the compressed air from the heater 42 from flowing out of these ends, thereby forcing the heated compressed air toward the output orifice 36b.

The lower surface of the base block 40 is cut at an angle, forming an acute angle with its front or forward surface, and is notched at 41. The lower channel 40d of the base block opens into the notch 41. A bonding shoe member 55 is sized to cooperatively mate with the notch 41 and is secured to the block 40 within the notch 41 by four fastening bolts 56 which are threaded into the block 40 (see FIGS. 2 and 3).

The bonding shoe 55 has a first lower surface 55a which lies generally coplanar with the lower angled surface of the base block 40. The shoe 55 further has a generally planar bonding surface 55b forming an angle with the first lower surface 55a of the shoe 55, such that the bonding surface 55b lies generally coplanar with the upper surface 24a of the substrates 24 when the bonding applicator 20 is operatively mounted for bonding, as illustrated in FIGS. 1 and 2. A passageway 57 is formed at an angle through the shoe 55 such that its upper end cooperatively addresses the output orifice 36b of the guide tube 36, and its lower end opens through the shoe bonding surface 55b. The shoe bonding surface 55b can further be characterized by a forward "toe" portion extending from the passageway 57 to the forward edge of the bonding surface 55b, and extension 55b2 thereof extending back from the passageway 57, as illustrated in FIG. 3. The forward "toe" portion 55b1 of the bonding surface 55b directly engages the hot melt strand as it emerges from the passageway 57 and immediately presses the core and melted theremoplastic adhesive coating thereof into bonding engagement with the upper surface 24a of the substrate 24. The "length" (in the direction of travel of the substrate) of the toe portion 55b1 of the bonding shoe surface 55b ensures maximum bonding contact of the shoe with the hot melt strand and enhances flattening of the core material and spreading of the thermoplastic adhesive onto the substrate surface 24a, thereby providing a good quality flat, broad bond to the substrate. The relatively broad width (as measured transversely to the direction of substrate movement) of the bonding shoe surface 55b ensures uniform flat contact of the bonding surface 55b with the upper surface 24a of the moving substrate 24. The backward extension 55b2 of the bonding surface 55b either directly contacts the upper surface 24a of the substrate 24 or is slightly spaced therefrom (as illustrated in FIG. 2) to minimize frictional contact therewith with the substrate surface; however, effectively blocks the flow of heated compressed air from the heater 42 and out through the passageway 57, thereby forcing the compressed air up through the heat exchanging guide tube 36.

As illustrated in FIGS. 1 and 2, the longitudinal axis of the guide tube 36 defines an acute angle with the advancing substrate. The passageway 57 through the bonding shoe 55 is angled to decrease even further the actute angle between the advancing hot melt strand 22 and the substrate surface 24a. The inner surfaces of the string guide passageway defined by the upper passage 36.1, the lower passage 36.2 and the shoe passageway 57 comprise continuous smooth walls to prevent removal of the hot melt adhesive from the core strand as it slidably engages those walls during the bonding process. In practicality, the passageway 57 through the shoe 55 defines an extension of the output orifice 36b of the guide tube 36.

In the preferred embodiment, the bonding shoe is made of hardened steel, and the bonding surface 55b thereof is chrome plated to improve wear characteristics. The length of the toe portion 55b1 of the bonding shoe surface is approximately one-half inch. It will be understood, however, that other materials and dimensions thereof could be used for constructing the bonding shoe. As illustrated in FIGS. 1 and 2, the bonding shoe is heated directly by heat conduction from the aluminum base block 40, as well as from direct contact with the heated compressed air from the heater 42, flowing through the channel 40d.

The heated portions of the bonding applicator 20 are insulated from the outer support frame 30 and from other parts of the applicator by insulation (generally indicated at 60 in FIG. 2). In the preferred embodiment, transite insulation is used for this purpose; however, other types of insulation could equally well be used.

A thermocouple 62 is imbedded within the base block 40 for accurately measuring the temperature thereof, and provides an output control signal by means of a pair of electrical conductors 63 to a control unit (not illustrated) for controlling the heat of the heater 42 and/or the volume of compressed air passing through the valve 47 and into the heater 42.

Tension or compression forces are applied to the bonding shoe 55 by means of a biasing apparatus, generally illustrated at 65. An enlarged view of the biasing means 65 is illustrated in FIG. 5. The biasing means 65 basically includes a bearing block member 66 mounted on the frame 30 for pivotal movement about the mounting axis 32, and having an upper bearing plate 66a. The bearing plate 66a has a hole formed therethrough in which the lower portion of a threaded rod 67 rides. A knob 68 mounted at the upper end of the threaded rod 67 enables easy turning of the rod. The projecting arm 31a of the support base 31 has an opening therein upon which is actually aligned a nut 69 which is fixedly secured to the support arm 31a. The rod 67 is threaded through the nut 69 until its lower end projects down into the opening formed in the bearing plate 66a, as illustrated in FIG. 5.

A spring 70 is coaxially aligned with the rod 67 and encircles the rod. The upper end of the spring is secured to a threaded plate 71, and the lower end of the spring 70 is secured to a lower plate 72 which is mounted to the bearing plate 66a. The upper plate 71 is threaded to the rod 67, for longitudinal movement with the rod 67 as it is threaded through the nut 69. A spring 70 is selected such that when in a "neutral" (nonforce exerting) state, the upper plate 71 of the spring will lie between the projecting support arm 31a and the bearing plate 66a. As the rod 67 is threaded into the nut 69 so as to "lower" the upper plate 71, the spring 70 will be compressed, thereby exerting compressive forces upon the bearing plate 66a, which compressive forces will be transmitted to the bonding shoe 55 through the bearing block 66 and the primary frame member 30. The actual amount of compressive force desired at the shoe bonding surface 55b can be readily varied by merely turning the threaded rod to the desired position. This "compressive-force" mode of operation is employed by the embodiments of the bonding applicator illustrated in FIGS. 1, 2 and 4.

When a "tension" applying mode of operation is desired for the biasing means 65, the rod 67 is threaded in a counterclockwise direction about its longitudinal axis, so as to lift the upper plate 71 from the neutral spring position, thereby expanding the spring 70. In its expanded position, the spring 70 will be in "tension," thereby applying a lifting or pulling force upon the bearing plate 66a, which tension force will be transmitted through the frame 30, tending to lift the bonding shoe 55 in a counterclockwise direction about the mounting axis 32. This mode of operation is useful when the bonding applicator 20 is employed for bonding hot melt strands to vertically moving substrates, as illustrated in FIGS. 6 and 7.

While a particular biasing construction has been illustrated, it will be understood that other equally acceptable biasing techniques can be used within the spirit and intent of this invention. For example, a pair of spring members, one for providing "compressive" forces and the other for providing "tension" forces could equally well be employed.

It may be desirable, depending upon the particular substrate to which the hot melt string is being applied, to provide means for cooling the bonded core and thermoplastic adhesive following the bonding operation by the shoe bonding surface 55b. A cooling wheel assembly is provided for this purpose in the preferred embodiment, and is illustrated at 75 in FIGS. 1 and 2. The wheel 75 preferably comprises a wheel or roller made of hard material such as steel. Other configurations of the wheel are also possible. For example, the hub of the wheel could be cast from aluminum, and be provided with a hardened steel tire, which could in turn be chrome-plated. The cooling wheel 75 rotates about a shaft mounted to an auxiliary cooling assembly frame 77 which is pivotally (or alternatively, rigidly) mounted about a mounting axis 78 at the base of the frame 30. In the embodiment of the invention illustrated in FIGS. 1 and 2, a bore 78a is drilled through the base block 30 for accomodating the bolt defining the mounting axis 78.

The auxiliary cooling assembly frame 77 defines an internal reservoir generally designated at 80 for holding a release agent liquid, which preferably comprises a solution of detergent in water or other appropriate water-soluble agent. One or more lubricating wicks 81 are mounted within the cooling assembly frame 77 for slidably engaging the cooling surface of the roller 75, and have their opposite ends extending within the reservoir 80 for wicking the release agent from the reservoir and uniformly onto the cooling surface of the wheel 75. A cellulose sponge has been found to provide a convenient and economical wick pad for the purpose of wetting the cooling wheel surface. A scraper blade 82 is also mounted onto the auxiliary cooling assembly frame 77 for slidably engaging the cooling surface of the roller 75 to remove any thermoplastic adhesive matter which may stick onto the surface of the wheel 75. The scraper blade 82 is maintained in contact with the cooling wheel surface by means of a slightly biased spring mechanism (not illustrated). Another configuration of the reservoir construction will be described later with respect to FIGS. 8-10.

The cooling wheel 75 is sized and mounted to the primary frame 30 so as to contact the core and hot melt combination on the substrate as soon as possible after the substrate has advanced past the toe portion 55b1 of the bonding shoe 55. In one embodiment of the invention, the tangent point, where the cooling wheel touches the substrate is within three quarters of an inch past the tip of the bonding shoe toe 55b1. In another embodiment, the spacing between the tip of the bonding shoe toe to the nip point of the trailing wheel is only 3 cm. Such close spacing of the cooling wheel 75 to the bonding station enables the cooling wheel to further press the hot melt string onto the substrate, providing further "flattening" action, since the hot melt on the string will still be soft and malleable and capable of further flattening, by the time it reaches the cooling wheel. Since the integrity of the bond (i.e. bond strength) is proportional to the flattened area of the core and thermoplastic adhesive over the substrate surface, such further flattening by the cooling wheel 75 enhances the bond strength. In the embodiment illustrated in FIGS. 1 and 2, the pressure exerted by the cooling wheel 75 upon the string and substrate is a function of the weight of the cooling wheel 75, and its support mechanism, including the frame assembly 77, the shaft 76, the scraper blade 82 and supporting apparatus and the weight of the release agent within the reservoir 80. If the cooling assembly 77 were rigidly mounted to the frame 30, the pressure exerted by the cooling wheel 75 can be determined by the biasing apparatus 65.

The embodiment of the bonding applicator illustrated in FIGS. 1 and 2, wherein the thermoplastic-adhesive coating is heated to its flow point by means of the heated compressed air flowing through the heater 24, provides significant advantages over prior art techniques using hot air for softening the adhesive. With this embodiment of the invention, the hot air is first directed at the adhesive-coated strand at the very base (i.e. the output orifice 36b) of the heat exchanger guide tube 36, so that the hottest portion of the guide tube is at the point where the string is applied to the substrate. This design minimizes the chance of premature melting of the thermoplastic adhesive coating in the upper portions of the guide tube, which could result in actual flow of the adhesive from the core strand within the tube, causing sticking or charring problems within the guide tube. The heat conducting base block 40 located adjacent the output orifice of the guide tube further enhances the rapid heating of the adhesive-coated strand adjacent the output orifice of the guide tube. Due to the heat retaining properties of the metal block 40, the temperature within the lower portion 36.2 of the guide tube is fairly uniformly maintained at the desired temperature, and aids in heat transfer to the thermoplastic adhesive through actual direct conduction as the coated strand engages the walls of the block 40 in the lower passageway 36.2. Therefore, the adhesive coated core is heated by both conduction and convection by the present invention. The actual temperature of the guide tube adjacent its output orifice 36b is controlled by the thermocouple 63 and associated control circuitry, to maintain a temperature sufficient to heat the thermoplastic adhesive to a value slightly above the flow point temperature of the adhesive. This construction also enables the bonding shoe to be directly heated both by conduction from the base block 40 and by convection from the heated compressed air flowing through the internal passageways formed through the block.

With the present invention, the length of the guide tube 36 can be substantially reduced, as compared to prior art techniques using such hot air adhesive softening techniques, since the heat intensity is greatest at the output orifice of the guide tube, and since a very small amount of the heated air is lost through the bonding shoe, due to the sealing action of the shoe with the substrate surface. The actual length of the guide tube, however, will vary depending upon the particular bonding conditions with which the bonding applicator 20 is used. As faster substrate speeds are used, and if higher temperatures are required, the required dwell time of the hot melt coated core within the guide tube will be increased. Further, since the bonding shoe itself is maintained at an elevated temperature during the bonding operation, the hot melt strand does not require over-heating within the guide tube to allow (i.e. to overcompensate) for cooling of the strand as it leaves the guide tube and before it is applied under pressure to the substrate surface. Another advantage inherent in the use of the bonding apparatus of this invention is that due to the substantial blockage of heated compressed air through the bonding shoe, due to engagement of the bonding shoe surface with substrate, the cooling roller 75 is not subjected to such heat, and thus performs more effectively than in prior art designs.

The bonding applicator 20 is illustrated in FIGS. 1 and 3 as applying a hot melt core material 22 to a substrate 24 moving over a substantially planar horizontal reactive surface. Alternatively, the reactive surface could be slightly curved, or could comprise a backup roller or wheel underlying the substrate and bonding shoe, for decreasing sliding resistance of the substrate against the reactive surface.

The bonding applicator 20, such as illustrated in FIGS. 1 and 2 can be readily adapted, simply by changing the bonding shoe 55, for bonding applications to a substrate moving in a vertical plane (see FIGS. 6 and 7). Referring to FIGS. 6 and 7, the substrate 24' comprises a tape material moving over a reactive surface 26' comprising the outer surface of a roller 27. As illustrated in the figures, the roller 27 rotates about its axis in a clockwise direction. The bonding shoe 55 illustrated in FIGS. 1 and 2 is rapidly replaced by a bonding shoe 55', by unfastening the fasteners 56 from the block 40, removing the bonding shoe 55 and refastening the bonding shoe 55' in its place. The bonding shoe 55' provides the same functions as the bonding shoe 55 illustrated in FIG. 3, except that the passageway 57' through the bonding shoe 55' leaves the shoe 55' through its "forward" surface, which comprises the shoe bonding surface 55b' for the vertical bonding application. It will be noted that in FIGS. 6 and 7, functional elements identical to those previously described with respect to FIGS. 1–3, are denoted by the same numerical designations, followed by a "prime" designation. The passageway 57' formed through the bonding shoe 55' is downwardly curved (as illustrated in FIG. 7) to direct the hot melt strand onto the advancing substrate surface 24a' in a direction substantially coplanar with the substrate surface 24a' at the bonding station.

While two configurations of the bonding shoe portion of this invention have been illustrated, it will be understood that a number of variations of the bonding shoe can be envisioned within the spirit and broad scope of this invention. Similarly, while a particular method of attachment of the bonding shoe to the guide and heating mechanism has been illustrated, it will be understood that a number of alternate, equally acceptable, mounting configurations can be envisioned with the spirit and scope of this invention.

A second embodiment of the bonding applicator 20 is illustrated in FIG. 4. Referring thereto, the guide tube (36) and block (40) assemblies previously described with respect to the first embodiment of the invention, are replaced by a combined guide tube and heating block member 90. The block 90 comprises, in the preferred embodiment, an aluminum block, heated by means of a plurality of electric resistance cartridge heaters, generally designated at 91, and illustrated as having electrical conducting leads projecting therefrom, for suitable connection to a heating control unit (not illustrated). The block 90 defines an elongate curved guide tube channel formed therethrough, through which the hot melt strand is guided, toward the bonding shoe 55. The bonding shoe 55 is secured to the block 90 in fashion similar to that previously described with respect to mounting of the bonding shoe 55 to the base shoe 40 for the first embodiment. In this embodiment of the invention, the entire aluminum block is heated by the electric resistance heaters, and thermoplastic adhesive coating on the core strand is heated by conduction with the aluminum block channel as the strand proceeds down and through the guide channel 90a. The arcuate, curved nature of the channel 90a ensures continuous contact of the strand against the aluminum block walls as the strand progresses from the receptor end of the channel, to the output orifice thereof, thus maximizing heat transfer from the aluminum block to the hot melt strand.

A temperature sensing thermocouple, mounted within the guide channel 90a (not illustrated) provides control signals to a control unit (not illustrated) for controlling the heating elements 91. In the embodiment illustrated in FIG. 4, the bonding shoe is directly heated by conduction from the block 90; however, the bonding shoe could also be separately heated by an electric heater similar to those used for heating the aluminum block 90.

Figures 8, 9:
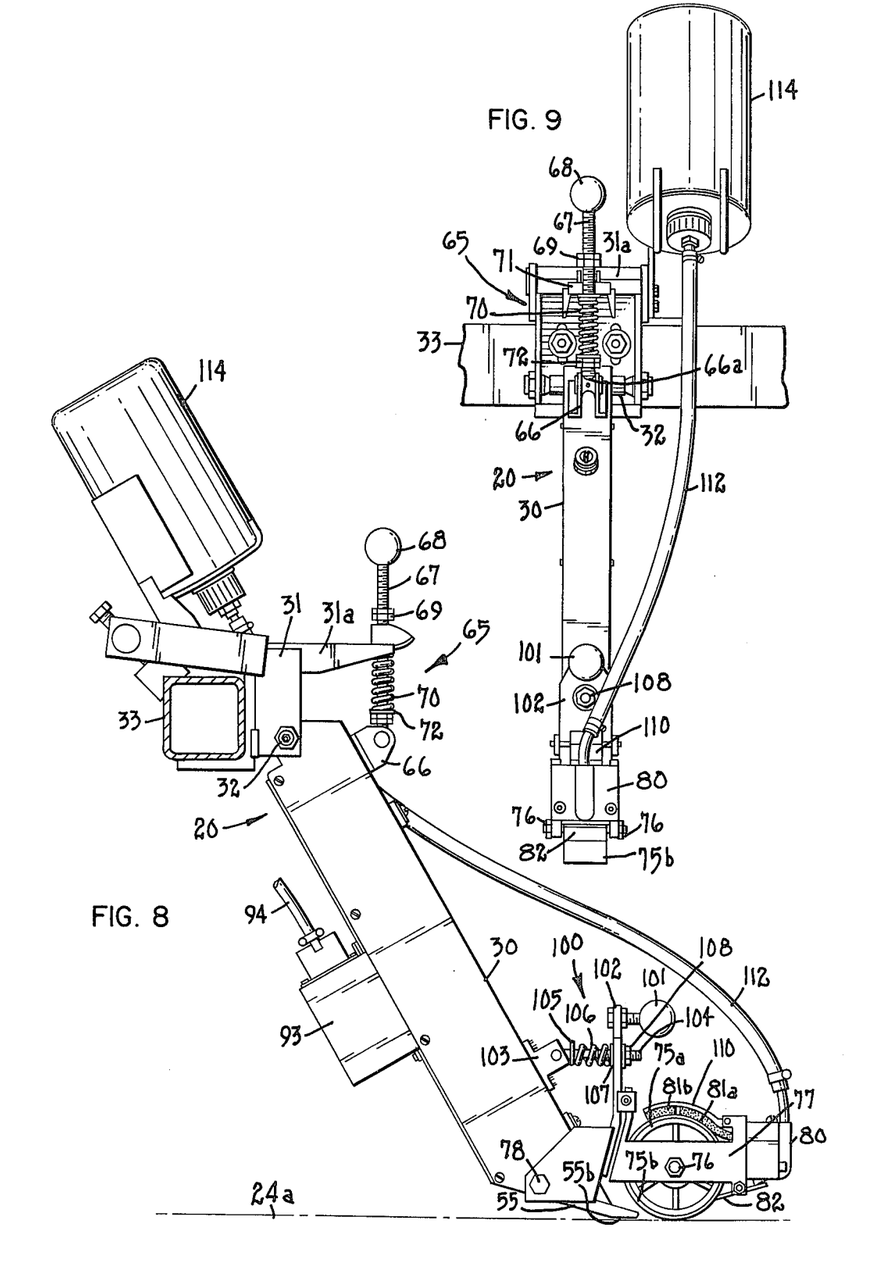
FIG. 8 is a side elevational view of a third embodiment of a bonding apparatus constructed according to the principles of this invention.
FIG. 9 is a front elevational view of the bonding apparatus disclosed in FIG. 8.
Figure 10:
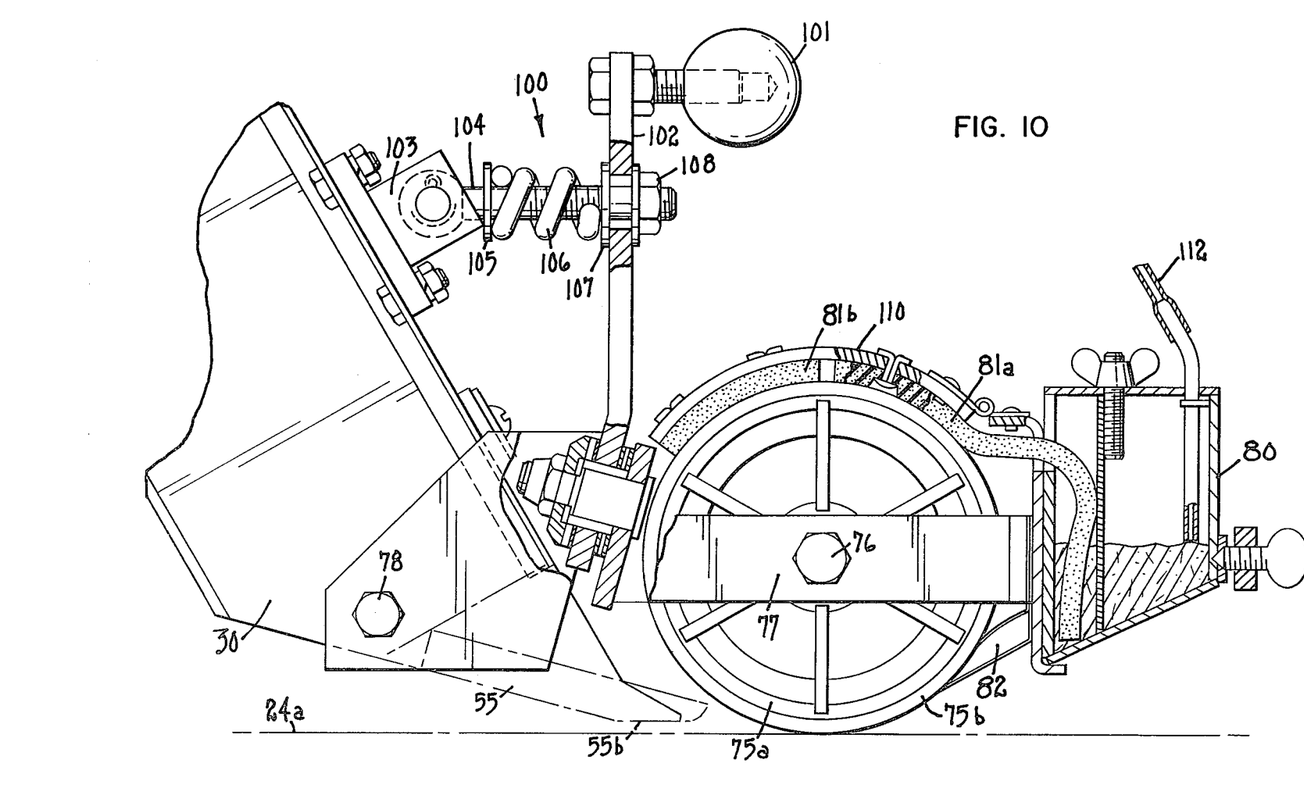
FIG. 10 is an enlarged cross-sectional view of the lower portion of the bonding apparatus disclosed in FIG. 8.

A third embodiment of the bonding applicator 20 is illustrated in FIGS. 8 through 10. Referring thereto, like numerals have been used to represent like parts common to the first and second embodiments of the previous Figures. For the purposes of describing additional features applicable to the third embodiment of the invention, the structure for heating the thermoplastic adhesive-coated strand 22, may be either of the construction described with respect to FIGS. 1 and 2 or of the construction described with respect to FIG. 4. A control box 93 is illustrated as secured to the frame 30 for providing the electrical control functions necessary for operation of the various heating and sensing means of the bonding apparatus. Electrical connection to the control box 93 is provided by means of the cable, generally designated at 94. It will also be noted that the support base 31 for the housing 30 includes a transverse beam portion 33, to facilitate mounting of the structure.

It will be noted that the trailing or cooling wheel assembly of the third embodiment of the invention is pivotally mounted about the mounting axis 78, such that controlled tension or pressure may be applied to the wheel 75 by means of the tensioning structure generally disclosed at 100. The tensioning structure 100 is similar in construction to the biasing apparatus 65. The tensioning structure includes a first bearing lever arm 102 to which is connected a knob or handle 101. The first bearing lever 102 is secured at its lower end to the auxiliary cooling assembly frame 77. The bearing lever 102 has a hole formed therein through which is mounted a threaded tensioning stud or bolt 104. The tensioning stud is pivotally secured at one end by means of the mounting bracket 103 to the housing 30, and is adjustably secured at its other end to the first bearing lever 102 by means of a bearing plate 107 and a nut 108 oppositely disposed on the first bearing lever adjacent the hole formed therethrough (see FIG. 10). A second bearing plate 105 is fixedly secured to the tensioning stud 104, and a biasing spring 106 is coaxially mounted over the tensioning stud 104 between the first and second bearing plates 107 and 105 respectively. By adjusting the tension of the spring 106 by means of the nut 108, the pressure applied through the first bearing lever 102 to the wheel 75 can be accurately selected. In preferred usage of the structure for applying strands 22 to veneer surfaces, the preferred pressure applied by the wheel 75 to the bonding surface 24a is approximately 20 to 25 pounds.

For certain usages of the bonding apparatus, it may be desirable to slightly lift the toe 55b of the bonding shoe slightly from the substrate surface 24a, and to simultaneously bond, set and cool the strand 22 emerging from under the toe 55b to the substrate surface 24a by the nip pressure exerted by the wheel 75. Such a situation is illustrated by the structure of FIG. 8. In such cases, it is extremely important that the lateral spacing between the end of the toe 55b and the nip point of the wheel 75 (i.e. the point at which the bonding pressure is applied to the string 22) be very small, preferably no greater than 3 centimeters.

An additional modification to the bonding apparatus illustrated in FIGS. 8 through 10, relates to the details of construction of the cooling wheel. The wheel structure (see FIG. 10) comprises a cast aluminum core portion 75a with a hardened steel tire 75b, the surface of which is chrome plated (not illustrated). The scraper blade 82 frictionally engages the chrome plated surface of the wheel. As illustrated in FIG. 10, the wick members 81 comprise a pair of wick members 81a and 81b, held against the outer surface of the wheel 75 by means of a curved retaining plate member 110. In practice, the forwardly disposed wick 81a applies the release agent from the reservoir to the surface of the wheel 75, and the second wick 81b uniformly spreads the release agent across the wheel surface. Also, as noted in this embodiment of the invention, the level of release agent within the reservoir 80 is maintained by a conduit 112 fed by means of a supply bottle 114 which is detachably mounted to the support base 31. The level of the release agent in the reservoir is maintained relatively constant by the vacuum formed within the supply bottle, by principles will known in the art.

From the foregoing description, it will be appreciated that the present invention solves many of the problems and deficiencies associated with the prior art bonding applicators for hot melt strand bonding applications. The present invention offers a significant degree of flixibility in use to varying conditions and bonding requirements, and provides improved bonds over prior art bonding techniques.

Other modifications of the invention will be apparent to those skilled in the art in light of the foregoing description. This description is intended to provide specific examples of individual embodiments covered by the present invention. Accordingly, the invention is not limited to the described embodiments, or to the use of specific elements therein. All alternative modifications and variations of the present invention which fall within the spirit and broad scope of the appended claims are covered.

What is claimed is:

1. Applicator apparatus for bonding a continous thermoplastic-adhesive coated core material to a substrate moving over a reactive surface, comprising:
    (a) heated guide means defining a heated passageway terminating at an output orifice, for guiding a continuous length of thermoplastic-adhesive coated core material through said passageway and for heating said material as it proceeds through said passageway such that the temperature of said material leaving said output orifice attains the melting flow-point temperature of said adhesive coating;

(b) a bonding shoe mounted to said guide means, and having a generally planar bonding surface adjacent said output orifice across and in engagement with which said heated continuous material passes upon leaving said orifice;

(c) means for heating said shoe;

(d) mounting means for pivotally mounting said guide means and said bonding shoe about a mounting axis such that said shoe bonding surface cooperatively addresses and lies substantially coplanar with said reactive surface, whereby said continuous material leaving said output orifice is sandwiched between said shoe bonding surface and a substrate moving over said reactive surface; and (e) biasing means operatively connected with said guide means for controllably applying a force to said guide means and said bonding shoe, about said mounting axis, to control the bonding force exerted by said shoe bonding surface in the direction toward said reactive surface, thereby controlling the bonding force exerted on said continuous material as it is pressed into a substrate moving over the reactive surface.

2. Applicator apparatus as recited in claim 1, wherein said guide means comprises:

(a) an elongated guide tube extending between a first end which receives said coated core material, and said output orifice;

(b) heater means operatively connected to a source of compressed air, for heating said source of compressed air and for delivering the heated compressed air to a heater outlet port; and (c) duct means operatively connecting said heater outlet port with said guide tube means for directing the heated compressed air into said guide tube, whereby said core material passing through said tube is heated by the compressed air flowing through the guide tube.

3. Applicator apparatus as recited in claim 2, wherein said duct means is configured to introduce said heated compressed air to said guide tube adjacent said output orifice end thereof.

4. Applicator apparatus as recited in claim 3, wherein said duct means is configured to introduce said heated compressed air into said output orifice of said guide tube.

5. Applicator apparatus as recited in claim 2, wherein said duct means comprises a block of heat-conducting metal defining a passageway therethrough connecting said heater outlet port with said guide tube, whereby said block is heated by said compressed air and maintains a stable heated environment for said compressed air prior to its introduction into said guide tube.

6. Applicator apparatus as recited in claim 5, wherein said shoe is mounted to said block material, and wherein said shoe is heated in part by conduction of heat from said block material.

7. Applicator apparatus as recited in claim 5, further including means for sensing the temperature of said heat-conducting block; and wherein said heater means includes means operatively connected to said temperature sensing means and responsive thereto for controllably maintaining the temperature of said heated compressed air at a predetermined level.

8. Applicator apparatus as recited in claim 2, wherein said bonding shoe is mounted to said guide means in a manner so as to be at least in part directly heated by said heated compressed air from said heater means.

9. Applicator apparatus as recited in claim 2, wherein said bonding shoe defines a passageway therethrough extending between inlet and outlet ports, and wherein said shoe is configured such that when mounted to said guide means said inlet port of said shoe cooperatively aligns with said output orifice of said guide tube, such that said guide tube and said shoe passageways form a continuous guide through which said core material passes, and wherein said outlet port of said shoe lies immediately adjacent said shoe bonding surface.

10. Applicator apparatus as recited in claim 9, wherein the general axis of said shoe passageway forms an obtuse angle with said shoe bonding surface, wherein the general direction of said shoe passageway axis as proceeding from said inlet to outlet ports of said shoe points in the general direction of movement of the substrate traveling over the reactive surface.

11. Applicator apparatus as recited in claim 9, wherein said shoe bonding surface has an extension extending back from said shoe passageway outlet port in the direction opposite to the direction of movement of a substrate over the reactive surface, wherein said shoe bonding surface and said extension thereof lie generally coplanar and cooperatively engage the moving substrate to substantially prevent flow of the heated compressed air through the shoe passageway outlet port, thereby causing said heated compressed air to flow up through said guide tube in a direction opposite to the advancement of said core material therethrough.

12. Applicator apparatus as recited in claim 1, wherein said bonding shoe is detachably removable from said heated guide means for ease of replacement thereof.

13. Applicator apparatus as recited in claim 1, wherein the length of said shoe bonding surface as measured in the direction of travel of said core material, and which presses said core material onto the moving substrate is approximately equal to or greater than one-half inch.

14. Applicator apparatus as recited in claim 1, further including cooling means mounted adjacent said bonding shoe, and in the direction downstream from the bonding shoe with respect to the direction of advancement of the substrate, for cooling the substrate and core material combination following the bonding operation thereof.

15. Applicator apparatus as recited in claim 14, wherein said cooling means is mounted to said guide means for cooperative movement therewith about said mounting axis.

16. Applicator apparatus as recited in claim 14, wherein said cooling means comprises a roller having a cylindrical cooling surface, wherein said roller is mounted such that the tangential contact portion of said roller surface lies generally coplanar with and immediately adjacent to said shoe bonding surface.

17. Applicator apparatus as recited in claim 16, wherein said cooling means includes a reservoir of release agent and applicator means for applying said release agent from the reservoir to the cooling surface of said roller for preventing said adhesive from adhering to said cooling surface.

18. Applicator apparatus as recited in claim 16, wherein said cooling means includes a scraper configured to slidably engage said cooling surface of said roller for removing residue of said thermoplastic-adhesive therefrom.

19. Applicator apparatus as recited in claim 1, wherein said guide means comprises:
   (a) an elongated guide tube extending along a curved axis and between a first end which receives said coated core material into said tube and said output orifice; and
   (b) heater means cooperatively connected with said guide tube for heating said guide tube; wherein said core material is heated by conduction from engagement with the walls of said guide tube as it progresses through said guide tube.

20. Applicator apparatus as recited in claim 19, wherein said guide means comprises in part, a block of heat-conducting metal defining said guide tube therein, and wherein said heater means comprises electrical heater elements operatively connected to heat said conductive block material.

21. Applicator apparatus as recited in claim 20, wherein said shoe is mounted to said block material, and wherein said shoe is heated at least in part by conduction of heat from said block material.

22. Applicator apparatus as recited in claim 1, wherein said biasing means is suitable for applying either compressive or tension forces to said guide means.

23. Applicator apparatus as recited in claim 14, including second biasing means operatively connected to said cooling means for providing adjustably controlled pressure between said cooling means and said substrate and core material combination.

24. Applicator apparatus as recited in claim 17, wherein said applicator means comprises first and second wick members slideably engaging said roller cooling surface, wherein said first wick member applies said release agents to said cooling surface and said second wick member uniformly spreads said release agent across said cooling surface.

25. Applicator apparatus as recited in claim 17, further including release agent supply means operatively connected with said reservoir for maintaining a constant level of release agent within said reservoir.

26. Bonding apparatus for securing thermoplastic-adhesive coated thread to a substrate moving over a reactive surface at a bonding station, comprising:
   (a) guide means having an elongate guide chamber for directing a thermoplastic-adhesive coated thread from a thread source and to a bonding station, said guide chamber extending from a receptor end to an output orifice lying adjacent said bonding station;
   (b) means cooperatively connected with said guide means for heating said coated thread as said thread proceeds through said guide chamber such that the adhesive coating overlying any length of said thread attains bonding consistency by the time that length of said coated thread emerges from said output orifice;
   (c) bonding shoe means having a generally planar shoe bonding surface, for pressing said heated thread leaving said output orifice into bonding engagement with a substrate moving over the reactive surface at said bonding station;
   (d) means for mounting said bonding shoe such that said shoe bonding surface cooperatively addresses and lies generally parallel to said reactive surface and directly adjacent said output orifice, whereby said heated thread emerging from said output orifice immediately passes across and in engagement with said shoe bonding surface and is pressed thereby into bonding engagement upon the moving substrate; and
   (e) bias means for urging said bonding shoe surface toward said reactive surface, thereby sandwiching the moving substrate and heated thread therebetween, at a selectable bonding force.

27. Bonding apparatus as recited in claim 26 further including means for heating said bonding shoe means.

28. Bonding apparatus as recited in claim 26, wherein said bonding shoe means is rapidly detachable for ease of replacement.

29. Bonding apparatus as recited in claim 26, wherein said means for mounting said bonding shoe means does so in a manner such that said shoe bonding surface is generally disposed in a horizontal plane for bonding said coated thread to a horizontally advancing substrate surface.

30. Bonding apparatus as recited in claim 26, wherein said means for mounting said bonding shoe means does so in a manner such that said shoe bonding surface is generally disposed in a vertical plane, for bonding said coated thread to a vertically advancing substrate surface.

31. Bonding apparatus as recited in claim 26, wherein said bonding shoe means defines a passageway therethrough, comprising an extension of said output orifice, and wherein said guide chamber and said output orifice as extended, gradually guide and change the direction of advancement of said coated thread in a manner such that when the thread leaves the output orifice, its direction of travel is substantially parallel to that of the substrate surface to which it is to be bonded.

32. Bonding apparatus as recited in claim 26, further including cooling means mounted for movement with said bonding shoe, and having a cooling surface lying in the general plane of said shoe bonding surface, for engaging the bonded coated thread and advancing substrate immediately downstream from the bonding station, whereby the cooling means further flattens the thread and adhesive coating onto the substrate while cooling said adhesive to a bonding consistency.

33. Bonding apparatus as recited in claim 32, wherein said heating means comprises a heated source of compressed air and means for directing said heated compressed air into said guide chamber; and wherein said bonding shoe means is configured such that when said shoe bonding surface cooperatively engages an advancing substrate at the bonding station, said shoe bonding surface substantially seals passage of said heated compressed air out of said output orifice, thereby shielding said cooling means from said heated compressed air.

34. Applicator apparatus as recited in claim 32, including second biasing means operatively connected to said cooling means for providing adjustably controlled pressure between said cooling means and said substrate and core material combination.

35. Bonding apparatus as recited in claim 32, wherein said cooling means includes a reservoir of release agent and applicator means for applying said release agent from the reservoir to said cooling surface for preventing said adhesive from adhereing to said cooling surface.

36. Applicator apparatus as recited in claim 35, wherein said cooling means comprises a roller having a cylindrical cooling surface, and wherein said applicator means comprises first and second wick members slideably engaging said cylindrical cooling surface, wherein said first wick member applies said release agent to said cylindrical cooling surface and said second wick member uniformly spreads said release agent across said cylindrical cooling surface.

37. Applicator apparatus as recited in claim 35, furter including release agent supply means operatively connected with said reservoir for maintaining a constant level of release agent within said reservoir.

38. Bonding apparatus for securing thermoplastic-adhesive coated thread to a substrate moving over a reactive surface at a bonding station, comprising:
  (a) guide means having an elongate guide chamber for directing a thermoplastic-adhesive coated thread from a thread source and to a bonding station, said guide chamber extending from a receptor end to an output orifice lying adjacent said bonding station;
  (b) means cooperatively connected with said guide means for heating said coated thread as said thread proceeds through said guide chamber such that the adhesive coating overlying any length of said thread attains bonding consistency by the time that length of said coated thread emerges from said output orifice;
  (c) bonding shoe means having a generally planar shoe bonding surface for maintaining the physical thermoplastic consistency of said heated thread leaving said output orifice, for subsequent bonding engagement at said bonding station;
  (d) means for mounting said bonding shoe such that said shoe bonding surface cooperatively addresses and lies generally parallel to and slightly spaced apart from said reactive surface and directly adjacent said output orifice;
  (e) nip and cooling roller means having a roller mounted such that the tangential contact portion of said roller surface lies generally coplanar with and immediately adjacent to said shoe bonding surface, for pressing and setting said heated thread having passed across in engagement with said bonding shoe surface at said bonding station, into bonding engagement upon the moving substrate;
  (f) bias means for urging said lower bonding surface toward the moving substrate at the bonding station, thereby sandwiching the moving substrate and heated thread between the roller surface and an underlying reactive surface, at a selectable bonding force.

* * * * *